United States Patent
Steinbach et al.

(10) Patent No.: US 10,069,845 B2
(45) Date of Patent: Sep. 4, 2018

(54) SYSTEM AND METHODS FOR SECURE SHORT MESSAGE SERVICE ENCRYPTION AND PROVISIONING

(71) Applicant: Verizon Patent and Licensing Inc., Arlington, VA (US)

(72) Inventors: Lodema M. Steinbach, Clayton, CA (US); Sethumadhav Bendi, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/363,669

(22) Filed: Nov. 29, 2016

(65) Prior Publication Data

US 2018/0152462 A1    May 31, 2018

(51) Int. Cl.
*H04L 9/32*    (2006.01)
*H04L 29/06*    (2006.01)
*H04W 4/14*    (2009.01)

(52) U.S. Cl.
CPC ........ H04L 63/123 (2013.01); H04L 63/0876 (2013.01); H04W 4/14 (2013.01)

(58) Field of Classification Search
None
See application file for complete search history.

(56) References Cited

U.S. PATENT DOCUMENTS

| | | | |
|---|---|---|---|
| 2002/0089943 A1* | 7/2002 | Faineant ............ | H04B 7/18582 370/319 |
| 2007/0280138 A1* | 12/2007 | Stern ..................... | H04L 12/189 370/254 |
| 2009/0215477 A1* | 8/2009 | Lee ......................... | H04L 51/38 455/466 |
| 2012/0314864 A1* | 12/2012 | Ramprasad ........... | H04L 63/065 380/270 |
| 2013/0029671 A1* | 1/2013 | Islam .................. | H04L 65/1069 455/445 |
| 2013/0095796 A1* | 4/2013 | Cho ........................ | H04W 4/14 455/411 |
| 2014/0096225 A1* | 4/2014 | Hussain ................ | G06F 19/322 726/11 |
| 2014/0162619 A1* | 6/2014 | Nicholson ............. | H04W 8/245 455/418 |

* cited by examiner

*Primary Examiner* — David Le

(57) ABSTRACT

A device may receive an encrypted short message service (SMS) message en route from an originating device to a recipient device, the encrypted SMS message to be encrypted by the originating device using a key. The device may identify a flag associated with the encrypted SMS message. The device may determine, based on the flag, that the SMS message is encrypted. The device may provide the encrypted SMS message to the recipient device.

20 Claims, 6 Drawing Sheets

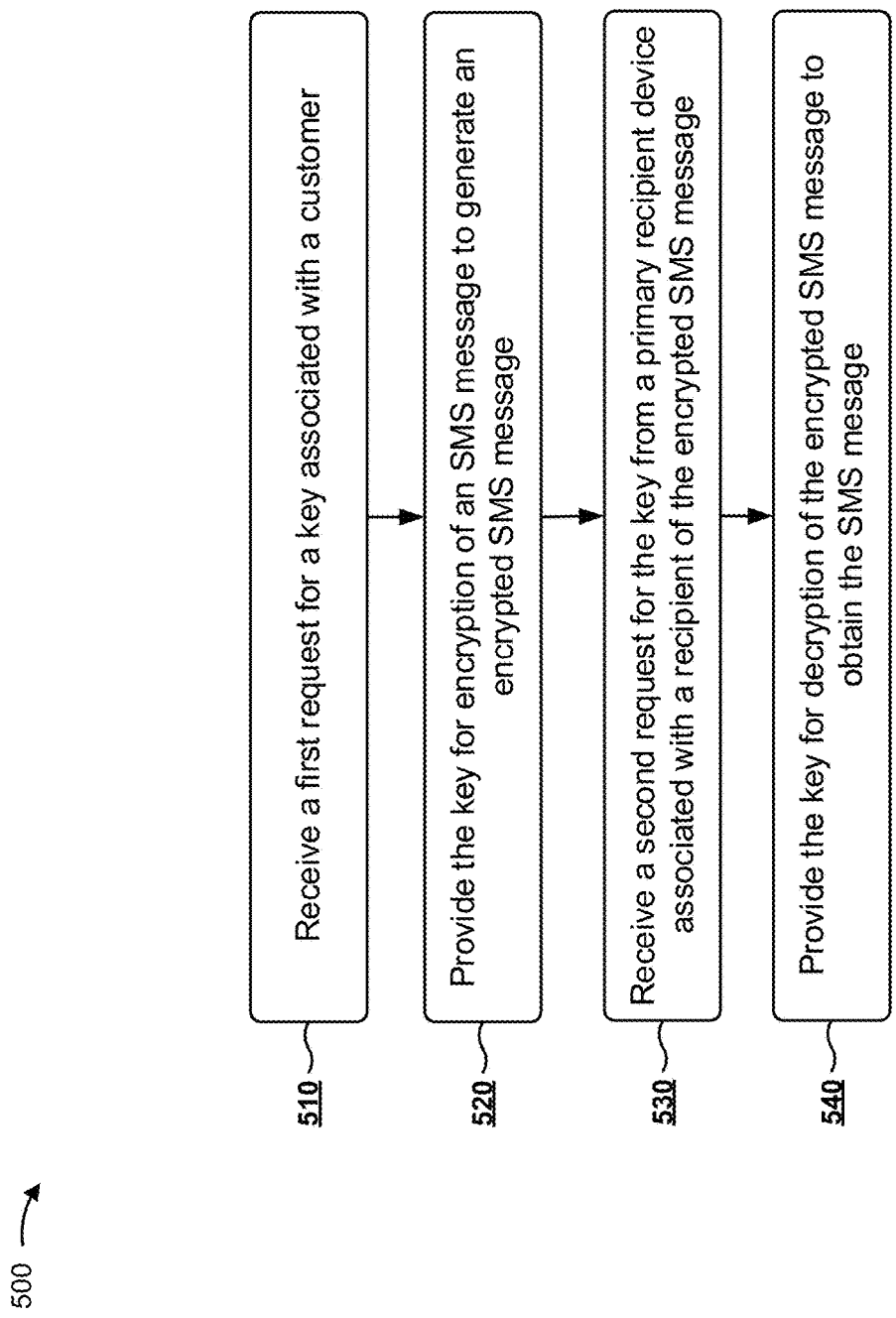

SYSTEM AND METHODS FOR SECURE SHORT MESSAGE SERVICE ENCRYPTION AND PROVISIONING

BACKGROUND

Short message service (SMS) is a text messaging service component of telephone, World Wide Web, and mobile telephony systems. SMS uses standardized communications protocols, such as the Short Message Peer-to-Peer (SMPP) protocol to enable fixed-line or mobile phone devices to exchange short text messages. An SMS message may be routed to one or more recipient devices (e.g., a set of destination devices associated with a user).

BRIEF DESCRIPTION OF THE DRAWINGS

FIG. 5 is a flow chart of an example process for managing keys associated with a secure SMS service.

DETAILED DESCRIPTION OF PREFERRED EMBODIMENTS

Figure 1A:
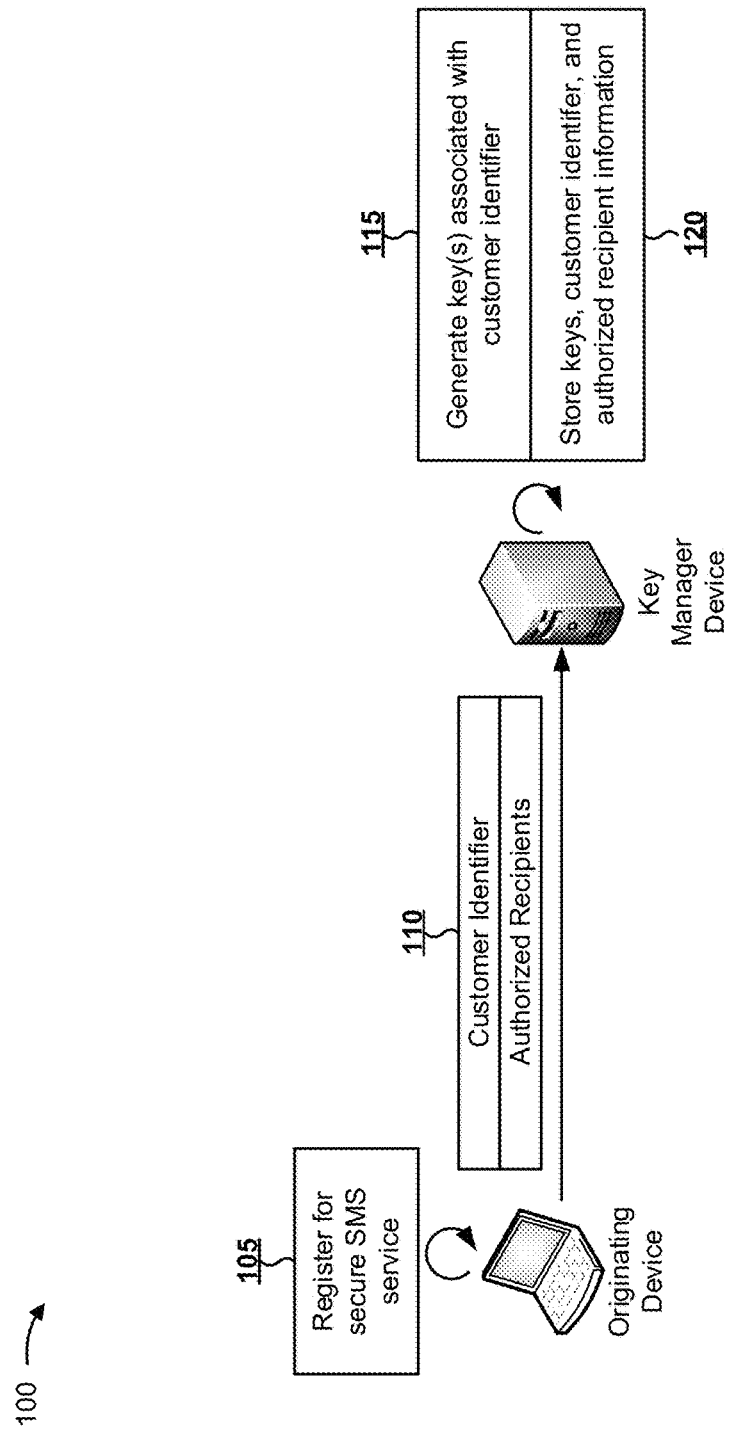
FIGS. 1A and 1B are diagrams of an overview of an example implementation described herein.

The following detailed description of example implementations refers to the accompanying drawings. The same reference numbers in different drawings may identify the same or similar elements.

A message (e.g., an SMS message, an MMS message, a short form message, a real time message, etc.) may be provided from an originating device to one or more recipient devices by one or more cellular network devices (e.g., one or more message devices, such as an originating SMS center associated with the originating device, a recipient SMS center associated with the recipient device, a gateway, etc.). Some messages may include confidential information. Thus, senders of messages may wish to encrypt their messages prior to sending. Also, ensuring that an message is provided only to an authorized viewer (e.g., a particular recipient device associated with the recipient) is of particular importance when the message includes confidential and/or sensitive information.

Some messaging services may provide the message to multiple, different recipient devices associated with the recipient. While providing messages to multiple different recipient devices may offer a level of convenience to the recipient, security of the message is decreased (e.g., when one of the multiple recipient devices has been compromised, lost, stolen, etc.). As an example, the message may be provided to a mobile phone, a computer, and a tablet associated with the recipient, thus potentially exposing the message to unauthorized parties. This problem may be exacerbated when the originating device and the set of recipient devices are associated with different cellular networks associated with different communication protocols, proprietary messaging formats, or the like.

Implementations described herein may permit a message to be encrypted upon transmission by an originating device based on a key (e.g., a security key associated with the originating device or a customer associated with the originating device), and to be decrypted by the recipient device based on the key. The key may be managed by a centralized key manager device to improve security of a content of the message. Implementations described herein may control delivery of a message so that the message is delivered to only a primary recipient device, of multiple different recipient devices associated with a recipient of the message, based on a security flag associated with the message.

In this way, end-to-end encryption is achieved via cellular network devices, even when the message is routed across multiple, different provider networks (e.g., based on a modification to the SMPP protocol). Further, confidential messages are delivered only to a primary recipient device of multiple different recipient devices associated with a recipient, thereby improving network security. This may facilitate the use of SMS messages for secure two-factor authentication, which may not be possible when using unencrypted or unsecured SMS messages. Also, security of the content of the messages is improved, which may conserve network resources that would otherwise be used to provide the secured information using another type of message (e.g., a more resource-intensive message, such as an email, a message in the Internet Protocol (IP) layer, etc.). For example, emails, IP layer messages, and the like may use more bandwidth, processor, or other network resources than the encrypted message (e.g., SMS message, MMS message, etc.).

Figure 1B:
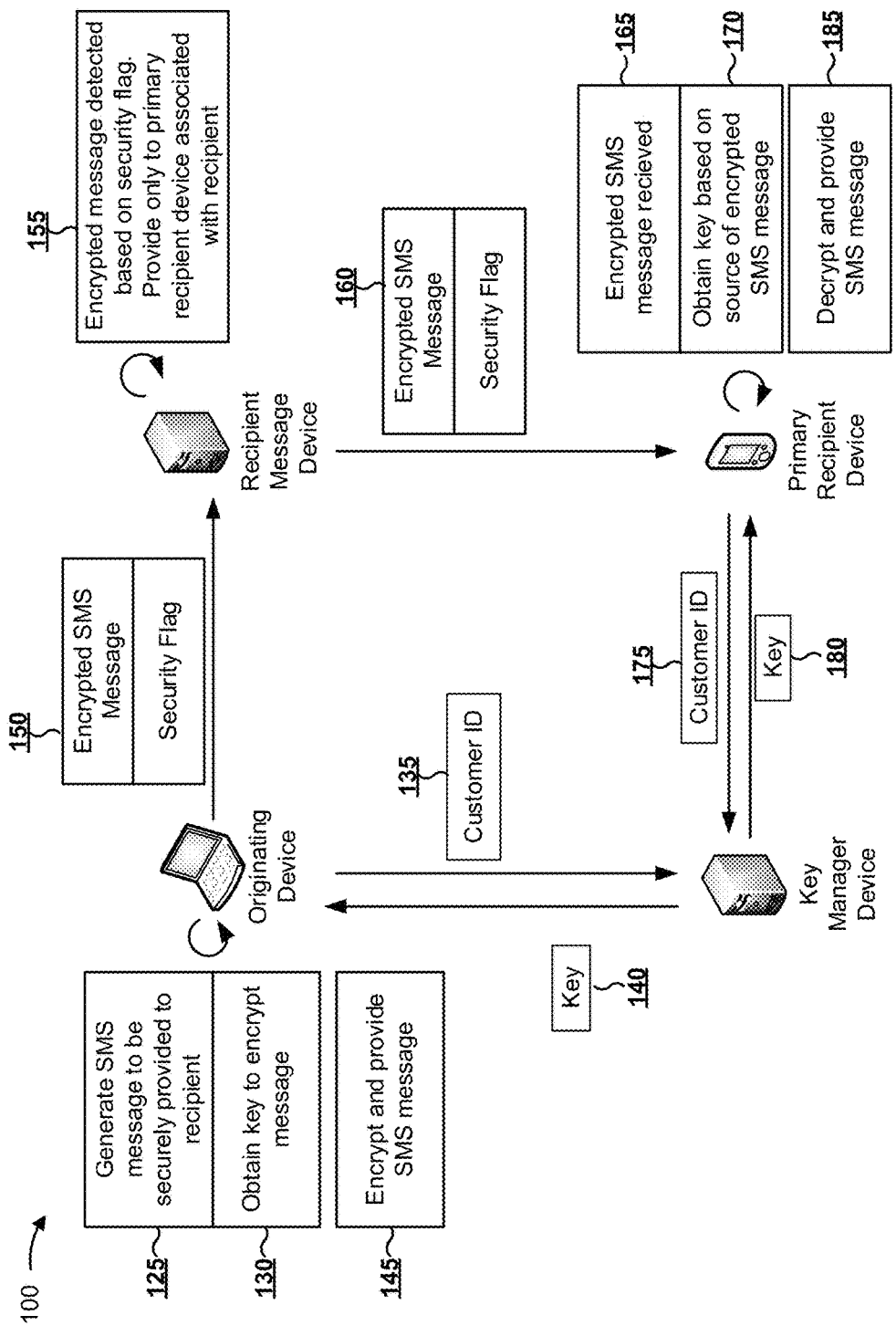

FIGS. 1A and 1B are diagrams of an overview of an example implementation 100 described herein. As shown by reference number 105 in FIG. 1A, an originating device may register for a secure SMS service. As part of the registration and as shown by reference number 110, the originating device may provide information regarding a customer identifier and authorized recipients to a key manager device. In some implementations, the customer identifier may include an international mobile subscriber identifier (IMSI), an international mobile equipment identifier (IMEI), a username, an account number, or the like, associated with the originating device and/or a customer.

In some implementations, the customer identifier may be associated with security information to be provided by the originating device to access a key associated with the customer. The authorized recipient information may identify one or more recipients or recipient devices that are permitted to receive and/or obtain encrypted SMS messages from the originating device. The information identifying authorized recipients may identify devices, account numbers, device identifiers (e.g., mobile device numbers (MDNs), IMEIs, network addresses), etc. of the authorized recipients.

As shown by reference number 115, the key manager device may generate one or more keys associated with the customer identifier. As described herein, a key may include a security key to be used to encrypt a message or decrypt an encrypted message (e.g., using an RSA algorithm, a triple Data Encryption Standard (DES) algorithm, Blowfish, Twofish, Advanced Encryption Standard (AES), and/or another type of encryption/decryption algorithm). In some implementations, the key manager device may use a preexisting key instead of generating a new key (e.g., by selecting an existing key from a set of available keys), which conserves processor resources of the key manager device as compared to generating a new key to be associated with the customer identifier every time a key is required. For example, the key manager device may generate keys to be used for the secure SMS service, and may store the keys for assignment to customer identifiers. As shown by reference number 120, the key manager may store the key(s), the customer identifier, and the authorized recipient information.

As shown in FIG. 1B, and by reference number 125, the originating device may generate an SMS message to be securely provided to a recipient. As shown by reference number 130, the originating device may obtain a key with which to encrypt the SMS message. For example, as shown by reference number 135, the originating device may obtain the key by providing the customer identifier associated with the originating device to the key manager device. As shown by reference number 140, the key manager device may provide a key associated with the customer identifier to the originating device. As shown by reference number 145, the originating device may encrypt the SMS message (e.g., using the key) to generate an encrypted SMS message, and may provide the encrypted SMS message towards the recipients device.

As shown by reference number 150, the originating device may provide the encrypted SMS message with a security flag. As described herein, the security flag may include information identifying the SMS message as an encrypted SMS message to be provided only to a primary recipient device (e.g., rather than being provided to multiple recipient devices associated with the recipient). In some implementations, the security flag may be associated with a value of a session initiation protocol (SIP) header field of the encrypted SMS message. For example, the SIP header field may be defined based on a particular SMPP protocol type-length-value (TLV) element. In some implementations, the encrypted SMS message may be provided with information identifying a source of the encrypted SMS message (e.g., the customer identifier, the source network address, security information associated with the originating device, the security flag, etc.).

As shown by reference number 155, the recipient message device may determine that the SMS message is an encrypted SMS message based on the security flag, and may provide the encrypted SMS message only to the primary recipient device associated with the recipient (e.g., instead of additionally providing the message to non-primary recipient devices associated with the recipient). For example, the flag may include a type-length-value (TLV) element indicating that the encrypted SMS message is to be provided only to the primary recipient device. Based on the TLV element, the recipient message device may route the encrypted SMS message only to the primary recipient device, instead of to other recipient devices associated with the recipient. For example, the primary message device may store information identifying the primary recipient device, and may route the encrypted SMS message to the primary recipient device based on the stored information and the TLV element. In some implementations, the encrypted SMS message may be provided to the recipient message device via an originating message device associated with the originating device. For example, the originating device and originating message device may be associated with a first wireless network or provider network, and the recipient device and recipient message device may be associated with a second wireless network or provider network. In this way, the originating message device and the recipient message device provide the encrypted SMS message only to the primary recipient device, even when the primary recipient device is associated with a different provider network than the originating device, based on a modification to the SMPP protocol.

As shown by reference number 160, the recipient message device may provide the encrypted SMS message and the security flag to the primary recipient device. As shown by reference number 165, the primary recipient device may receive the encrypted SMS message and may determine that the encrypted SMS message is encrypted based on the security flag. As shown by reference number 170, the primary recipient device may obtain a key based on the source of the encrypted SMS message (e.g., by providing a customer identifier associated with the source to the key manager device, as shown by reference number 175). As shown by reference number 180, the key manager device may provide the key (e.g., after identifying the key based on the customer identifier). As shown by reference number 185, the primary recipient device may decrypt the encrypted SMS message based on the key to obtain the SMS message, and may provide the SMS message for display.

As shown in FIGS. 1A and 1B, end-to-end encryption of SMS messages is achieved irrespective of whether the SMS message travels across multiple, different networks. Further, confidential messages are delivered to a primary recipient device, of multiple different recipient devices associated with a recipient, thereby improving security of the confidential messages.

In some implementations, the multiple, different networks may be associated with different service providers. Additionally, or alternatively, the multiple, different networks may be associated with a particular service provider (e.g., in different geographical areas, using different protocols, etc.). In such a case, both the originating message device and the recipient message device may be configured to perform the implementations described herein. For example, different service providers may coordinate to configure message devices to perform implementations described herein. Additionally, or alternatively, a standard or protocol associated with the message devices (e.g., the SMPP protocol) may be modified to implement the processes described herein.

While systems and methods described herein are described in the context of SMS messages, systems and methods described herein are equally application for any other type of cellular network message, such as an MMS message, a short form message, a Real Time message, and so on.

As indicated above, FIGS. 1A and 1B are provided merely as an example. Other examples are possible and may differ from what was described with regard to FIGS. 1A and 1B.

Figure 2:
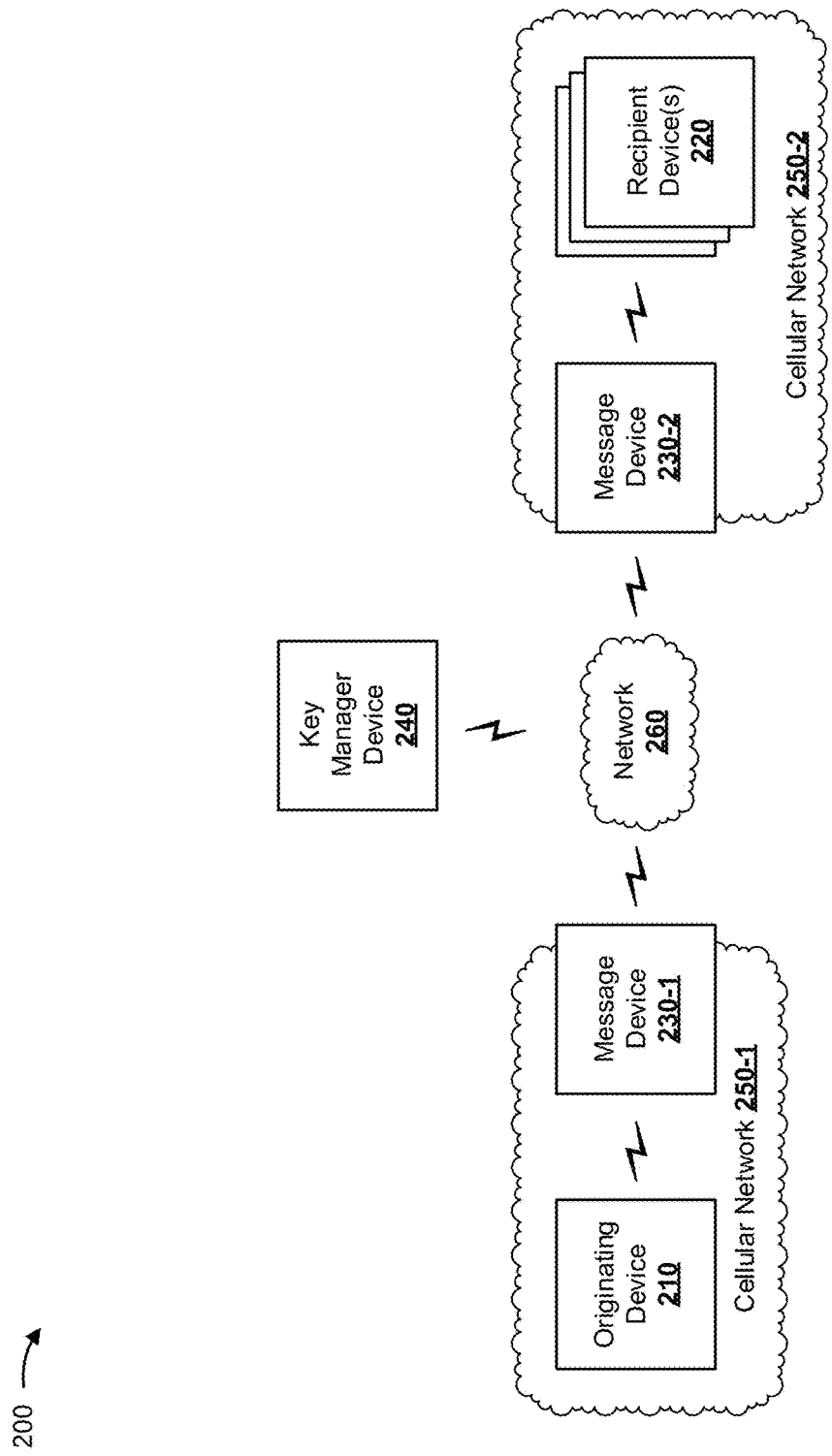
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an originating device 210, one or more recipient device(s) 220, a first message device 230-1 and a second message device 230-2, a key manager device 240, cellular networks 250-1 (associated with message device 230-1) and 250-2 (associated with message device 230-2), and a network 260. Devices of environment 200 may interconnect via wired connections, wireless connections, or a combination of wired and wireless connections.

Originating device 210 includes one or more devices capable of receiving, generating, storing, processing, and/or providing information associated with an SMS message to be encrypted. For example, originating device 210 may include a communication and/or computing device, such as a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device.

Recipient device 220 includes one or more devices capable of receiving, generating, storing, processing, and/or providing information associated with an SMS message. For example, recipient device 220 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, multiple recipient devices 220 are associated with the same recipient. In other words, an SMS message, sent to the recipient, may be received by the multiple recipient devices 220.

Message device 230 includes a device (e.g., a cellular network device) that receives, stores, processes, routes, and/or provides messages en route from originating device 210 to recipient device 220. For example, message device 230 may include a server, a group of servers, an SMS center (SMSC), a gateway, a router, an over-the-top (OTT) messaging server, an IMS application processor, or the like. As described herein, different originating devices 210 and recipient devices 220 may be associated with different message devices 230. For example, one message device 230 may serve devices located in a first geographical area and/or associated with a first provider network or cellular network 250-1, and another message device 230 may serve devices located in a second geographical area and/or associated with a second provider network or cellular network 250-2. Message devices 230 may interact based on a communication protocol, such as the Short Message Peer-to-Peer (SMPP) protocol, or the like.

Key manager device 240 includes one or more devices capable of receiving, storing, generating, processing, and/or providing information associated with security keys. For example, key manager device 240 may include a server device, a group of server devices, or the like. In some implementations, key manager device 240 may be implemented as part of a cloud computing environment.

Cellular network 250 includes a cellular or wireless network (e.g., a long-term evolution (LTE) network, a long-term evolution advanced (LTE+) network, a code division multiple access (CDMA) network, a 3G network, a 4G network, a 5G network, etc.). In some implementations, cellular network 250 may include a provider network that is associated with a particular cellular network provider. For example, cellular network 250-1 may be associated with a first cellular network provider, and cellular network 250-2 may be associated with a second cellular network provider.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example for illustrative purposes only. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
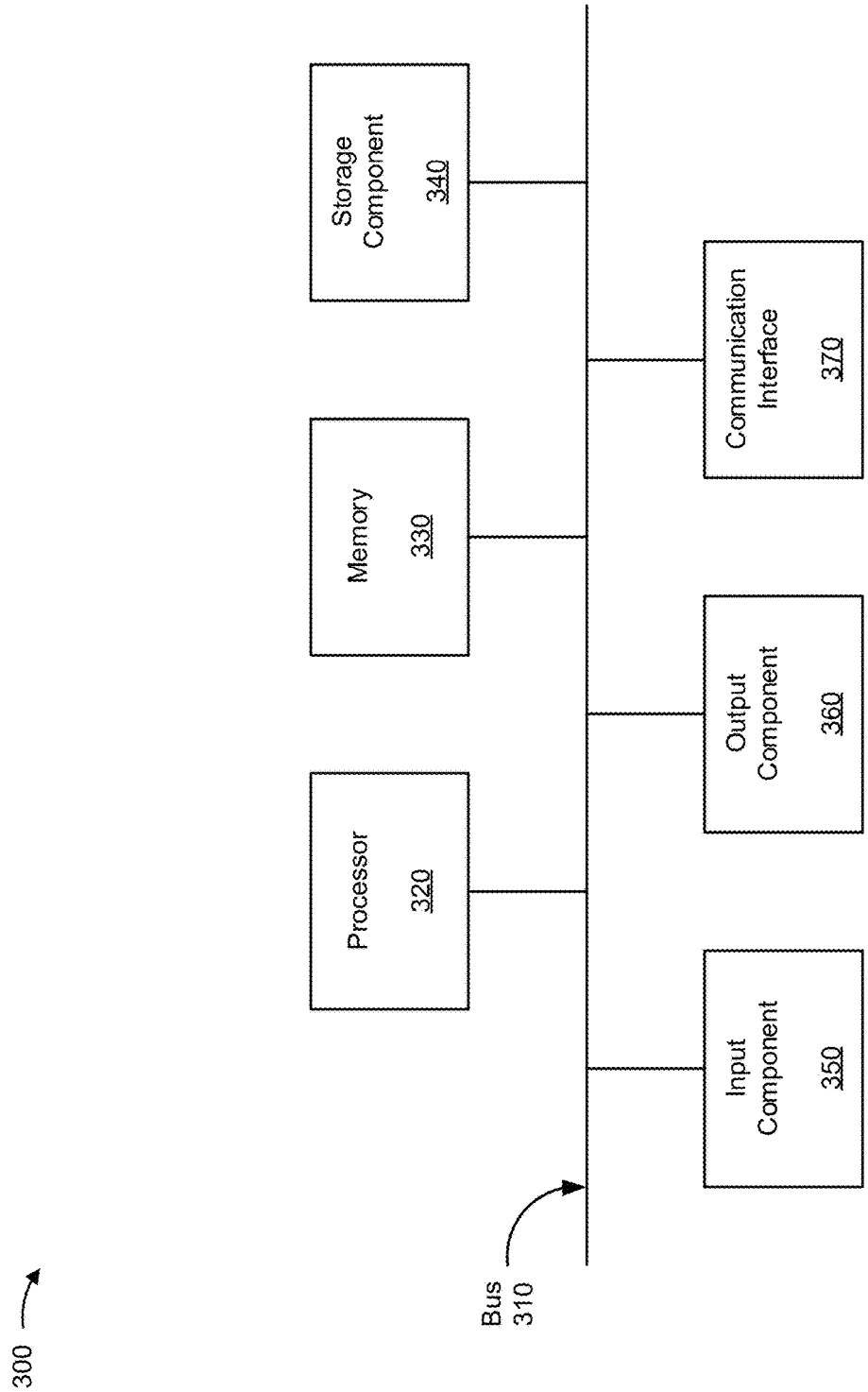
FIG. 3 is a diagram of example components of one or more devices of FIG. 2.

FIG. 3 is a diagram of example components of a device 300. Device 300 may correspond to originating device 210, recipient device 220, message device 230, and/or key manager device 240. In some implementations, originating device 210, recipient device 220, message device 230, and/or key manager device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
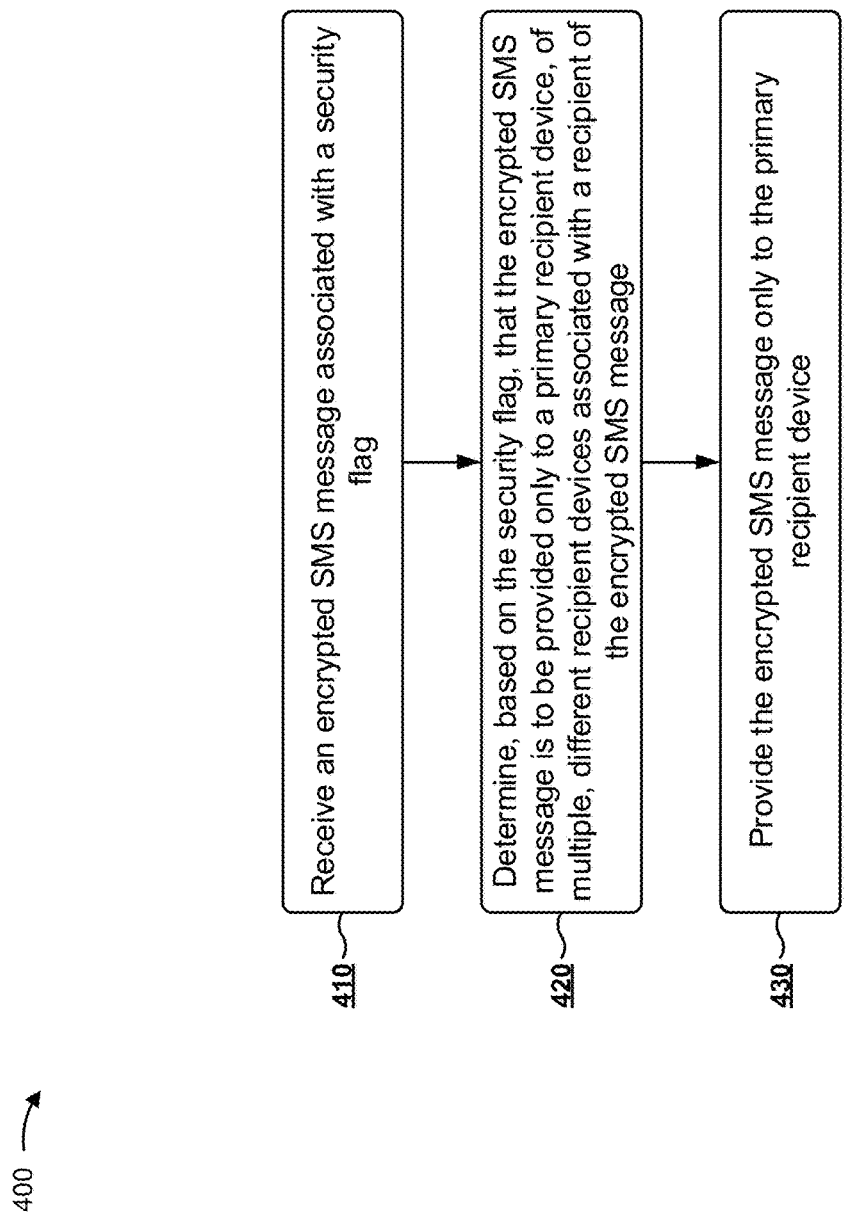
FIG. 4 is a flow chart of an example process for providing an encrypted SMS message to a primary recipient device of multiple recipient devices associated with a recipient.

FIG. 4 is a flow chart of an example process 400 for providing an encrypted SMS message to a primary recipient device of multiple recipient devices associated with a recipient. In some implementations, one or more process blocks of FIG. 4 may be performed by message device 230 (e.g., a recipient message device 230 associated with recipient device 220). In some implementations, one or more process blocks of FIG. 4 may be performed by another device or a group of devices separate from or including message device 230, such as originating device 210, recipient device(s) 220, and/or key manager device 240.

As shown in FIG. 4, process 400 may include receiving an encrypted SMS message associated with a security flag (block 410). For example, message device 230 (e.g., recipient message device 230 associated with recipient device 220) may receive an encrypted SMS message. In some implementations, recipient message device 230 may receive the encrypted SMS message from another message device 230 (e.g., an originating message device 230 associated with an originating device 210). In some implementations, recipient message device 230 may receive the encrypted SMS message from originating device 210 (e.g., recipient message device 230 may act as both originating message device 230 and recipient message device 230).

The encrypted SMS message may be generated and/or encrypted by originating device 210. For example, originating device 210 may encrypt the encrypted SMS message based on a key associated with a customer associated with originating device 210, as described in more detail in connection with FIG. 5, below.

In some implementations, originating device 210 and/or originating message device 230 may be associated with a different cellular network 250 than that of recipient message device 230 and/or recipient device 220. In such a case, originating message device 230 and recipient message device 230 may communicate based on the SMPP protocol. For example, originating message device 230 and recipient message device 230 may include SMS centers that are configured to route SMS messages from originating devices 210 to recipient devices 220 based on the SMPP protocol. In this way, encryption and routing of encrypted SMS messages to primary recipient device 220 via multiple, different cellular networks 250 is possible.

Recipient message device 230 may receive a security flag in association with the encrypted SMS message. The security flag may include one or more bits that indicate that the encrypted SMS message is to be provided only to a primary recipient device 220 associated with a recipient of the encrypted SMS message. For example, as described herein, a recipient may be associated with multiple, different recipient devices 220. Some SMS services may deliver an SMS message to each recipient device 220 associated with a recipient (e.g., cloud-based messaging services). As such, the SMS message may be exposed to unintended parties that may access the SMS message via a stolen or compromised recipient device 220.

In some implementations, the security flag may be defined based on a particular type-length-value element (TLV element) of the SMPP protocol. The particular TLV element may define an optional field of a session initiation protocol (SIP) header. In some implementations, the particular TLV element may identify an optional field of a payload of an SMS packet, and the security flag may be included in the optional field of the payload. Using an optional field of the SIP header may improve backward compatibility of the encrypted SMS. Also, defining the optional field in the SMPP protocol permits communication across different cellular networks 250 between message devices 230 that use the SMPP protocol. Thus, security of the encrypted SMS message across different cellular networks 250 is improved.

In some implementations, the encrypted SMS message may be associated with message information. As described herein, the message information may identify a destination of the message (e.g., based on a device identifier, account information associated with the recipient, etc.). Additionally, or alternatively, the message information may identify the source of the message (e.g., customer information identifying originating device 210 and/or a customer associated with originating device 210, security information to be provided by recipient device 220 to obtain a key to decrypt the encrypted SMS message, etc.). Recipient message device 230 may use the message information to route the message to primary recipient device 220 and/or to identify the customer associated with the encrypted SMS message.

As further shown in FIG. 4, process 400 may include determining, based on the security flag, that the encrypted SMS message is to be provided only to a primary recipient device, of multiple, different recipient devices associated with a recipient of the encrypted SMS message (block 420). For example, recipient message device 230 may determine that the encrypted SMS message is to be provided only to a primary recipient device 220 based on the security flag. As described herein, the recipient may be associated with multiple, different recipient devices 220 including the primary recipient device 220 (e.g., the different recipient devices 220 may be registered to the recipient through a cloud-based messaging service). When the encrypted SMS message is not associated with the security flag, recipient message device 230 may deliver the encrypted SMS message to each of the multiple, different recipient devices 220, thus decreasing the security of the encrypted SMS message and using additional network resources in relation to when the encrypted SMS message is delivered only to the primary recipient device 220.

In some implementations, primary recipient device 220 may be selected by the recipient associated with primary recipient device 220. For example, the recipient may provide information identifying one of the multiple recipient devices 220 as the primary recipient device 220, such as a device identifier, a message sent from primary recipient device 220, or the like. The recipient may provide the information as part of an onboarding process for primary recipient device 220, and the information may be provided to key manager device 240, recipient message device 230, a home subscriber server (HSS), or another device. In this way, the recipient may specify the primary recipient device 220, thus increasing security of the encrypted SMS message (e.g., when the encrypted SMS message would otherwise be directed to an insecure device such as a recipient device 220 other than the primary recipient device 220). In some implementations, recipient message device 230 may determine the primary recipient device 220 based on the encrypted SMS message. For example, the encrypted SMS message may identify a destination recipient device 220, and recipient message device 230 may identify the destination recipient device 220 as the primary recipient device 220 (e.g., instead of other recipient devices 220 associated with the recipient). In this way, network resources are conserved that would otherwise have been used to determine and store information identifying primary recipient device 220, and to obtain the information identifying primary recipient device 220 when routing the message.

As further shown in FIG. 4, process 400 may include providing the encrypted SMS message only to the primary recipient device (block 430). For example, recipient message device 230 may provide the encrypted SMS message only to the primary recipient device 220. In some implementations, recipient message device 230 may not provide the encrypted message to other recipient devices 220, of the multiple recipient devices 220 associated with the recipient. In this way, the likelihood that the encrypted SMS message is intercepted by an unintended party (e.g., a malicious party) that accessed one of the other recipient devices 220 is reduced. In some implementations, recipient message device 230 may provide message information associated with the message (e.g., a destination of the message, a source of the message, etc.). In some implementations, recipient message device 230 may route the encrypted SMS message to the primary recipient device 220. For example, recipient message device 230 may route the encrypted SMS message based on message information identifying the primary recipient device 220 as the destination of the encrypted SMS message. By sending the encrypted SMS message to only primary recipient device 220, recipient message device 230 conserves network resources that would otherwise be used to send the encrypted SMS message to multiple recipient devices 220.

In some implementations, recipient message device 230 may change a destination of the encrypted SMS message. For example, assume that the encrypted SMS message identifies a particular recipient device 220, other than the primary recipient device 220, as a destination of the message. Recipient message device 230 may route the encrypted SMS message to the primary recipient device 220 instead of the particular recipient device 220. For example, recipient message device 230 may change a header of the encrypted SMS message to identify a network address associated with primary recipient device 220 instead of a network address associated with the particular recipient device 220, and may route the encrypted SMS message based on the header. In this way, encrypted SMS messages may be rerouted to a designated primary recipient device 220 associated with a recipient, which may increase security of the encrypted SMS message when the designated primary recipient device 220 is known to be more secure than another recipient device 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for managing keys associated with a secure SMS service. In some implementations, one or more process blocks of FIG. 5 may be performed by key manager device 240. In some implementations, one or more process blocks of FIG. 5 may be performed by another device or a group of devices separate from or including key manager device 240, such as originating device 210, recipient device(s) 220, and/or message device 230.

As shown in FIG. 5, process 500 may include receiving a first request for a key associated with a customer (block 510). For example, key manager device 240 may receive a first request from originating device 210. Originating device 210 may provide the first request to obtain a key associated with a customer (e.g., a customer associated with originating device 210, requesting to encrypt an SMS message to be provided to recipient device 220). As described herein, the first request may identify the customer. For example, the first request may include a customer identifier associated with the customer. In some implementations, key manager device 240 may identify the customer based on information identifying originating device 210. For example, key manager device 240 may determine a device identifier and/or a network address associated with originating device 210, may determine that the device identifier and/or the network address is associated with a particular customer, and may identify a key associated with the particular customer.

As described herein, key manager device 240 may generate, store, and provide keys associated with customers and used to encrypt or decrypt SMS messages. In some implementations, key manager device 240 may receive information identifying a customer, and may generate one or more keys associated with the customer (e.g., as part of a registration or onboarding process for the customer). Additionally, or alternatively, key manager device 240 may select a key, from a pool of available keys, to be associated with the customer. In some implementations, key manager device 240 may generate a new key to replace a particular key, such as when the particular key is compromised and/or after the particular key has expired (e.g., based on a time-to-live value associated with the particular key). Additionally, or alternatively, key manager device 240 may generate a new key based on a request for a new key from a customer.

As further shown in FIG. 5, process 500 may include providing the key for encryption of an SMS message to generate an encrypted SMS message (block 520). For example, key manager device 240 may provide the key to originating device 210. Originating device 210 may encrypt an SMS message based on the key to generate an encrypted SMS message. For example, originating device 210 may encrypt the SMS message based on the American Encryption Standard (AES) algorithm, a Data Encryption Standard (DES) algorithm, the Blowfish algorithm, the Twofish algorithm, or the like.

Originating device 210 may provide the encrypted SMS message to an originating message device 230 for routing or transmission to a recipient message device 230. Recipient message device 230 may route the encrypted SMS message to a primary recipient device 220 associated with a recipient of the encrypted SMS message, as described in more detail in connection with FIG. 4, above.

As further shown in FIG. 5, process 500 may include receiving a second request for the key from a primary recipient device associated with a recipient of the encrypted SMS message (block 530). For example, key manager device 240 may receive a second request for the key from a primary recipient device 220 associated with the recipient of the encrypted SMS message. The second request may identify the customer associated with originating device 210 and the key (e.g., based on a customer identifier associated with the customer, a network address or device identifier associated with originating device 210, security information associated with the customer, or the like).

In some implementations, the second request may include security information. Key manager device 240 may selectively provide the key based on the security information. For example, key manager device 240 may validate the security information (e.g., by comparing the received security information and stored security information associated with the customer). When the security information is valid, key manager device 240 may provide the key to recipient device 220, thereby improving security of the encrypted SMS message. In some implementations, the security information may be time-based. For example, the key provided to originating device 210 may be valid for a particular length of time. When recipient device 220 does not request the key within the particular length of time, then originating device 210 may provide another encrypted message using another key stored by key manager device 240. In this way, security of the encrypted SMS message is improved.

As further shown in FIG. 5, process 500 may include providing the key for decryption of the encrypted SMS message to obtain the SMS message (block 540). For example, key manager device 240 may provide the key to permit primary recipient device 220 to decrypt the encrypted SMS message. Primary recipient device 220 may use the key to decrypt the encrypted SMS message to obtain the SMS message. In some implementations, primary recipient device 220 may provide the content of the SMS message for display to a user of primary recipient device 220.

In some implementations, primary recipient device 220 may provide information indicating that the SMS message is a secure SMS message (e.g., a lock icon, a sound, etc.) and/or information identifying the source of the encrypted SMS message. In some implementations, primary recipient device 220 may be configured to destroy the SMS message within a particular amount of time after unencrypting the encrypted SMS message or displaying the unencrypted SMS message (e.g., within 5 minutes, within 30 minutes, within a week, etc.). In some implementations, the particular amount of time may be identified in a field of a header of the encrypted SMS message. In some implementations, a user of originating device 210 may specify the particular amount of time. By automatically destroying the SMS message, security of a content of the SMS message may be improved over not destroying the SMS message.

After receiving the encrypted SMS message, primary recipient device 220 may generate an encrypted SMS message to provide back to the originating device 210. The encrypted SMS message may be generated, encrypted, routed, and decrypted in a similar manner as discussed above with respect to FIGS. 4 and 5. For example, primary recipient device 220 may request a key associated with the customer, may encrypt an SMS message based on the key, and may provide the encrypted SMS message for routing to originating device 210. Originating device 210 may obtain the key from key manager device 240, may decrypt the SMS message based on the key, and may provide the decrypted SMS message (e.g., for storage or display). In this way, end-to-end encryption of SMS messages is achieved using a key manager device 240, which improves security of encrypted SMS messages. Further, the encrypted SMS messages may be provided only to a primary recipient device 220, which further increases security of the encrypted SMS message from interception or tampering.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As described herein, end-to-end encryption for an SMS message is achieved using cellular network devices, even when the SMS message travels across multiple, different networks. Further, confidential messages are ensured delivery only to a primary recipient device 220 of multiple different recipient devices 220 associated with a recipient, thereby improving network security. Security of the content of the SMS messages is improved, which conserves network resources by reducing network overhead and processor usage associated with usage of other messaging applications or protocols to encrypt and send secure messages. These resources would otherwise be used to provide the secured information using another type of message (e.g., a more resource-intensive message, such as an email, a message in the IP layer, etc.).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive an encrypted short message service (SMS) message en route from an originating device to a primary recipient device,
the encrypted SMS message to be encrypted by the originating device using a key,
the primary recipient device being one of a plurality of destination devices associated with a recipient of the encrypted SMS message, and
one or more non-primary recipient devices being one or more of the plurality of destination devices associated with the recipient;
identify a flag associated with the encrypted SMS message;
determine, based on the flag, that the encrypted SMS message is to be provided to only the primary recipient device; and
provide the encrypted SMS message with the flag, where the encrypted SMS message is provided only to the primary recipient device and not to the one or more non-primary recipient devices identified as one or more of the plurality of destination devices associated with the recipient by the encrypted SMS message.

2. The device of claim 1, where the flag comprises a value of a Session Initiation Protocol (SIP) header field of the encrypted SMS message.

3. The device of claim 2, where the one or more processors, when identifying the flag, are to:
identify the flag based on a particular type-length-value element of a Short Message Peer-to-Peer (SMPP) protocol.

4. The device of claim 1, where the encrypted SMS message is a first SMS message; and
where the one or more processors are further to:
receive a second SMS message en route to the primary recipient device;
determine that the second SMS message does not include the flag; and
provide the second SMS message to the one or more non-primary recipient devices.

5. The device of claim 1, where the one or more processors, when providing the encrypted SMS message, are to:
provide the flag to the primary recipient device to permit the primary recipient device to obtain the key based on the flag.

6. A non-transitory computer-readable medium storing instructions, the instructions comprising:
one or more instructions that, when executed by one or more processors of a device, cause the one or more processors to:
receive an encrypted short message service (SMS) message en route from an originating device to a primary recipient device,
the encrypted SMS message having been encrypted by the originating device;
identify a flag associated with the encrypted SMS message;
determine, based on the flag, that the encrypted SMS message is to be provided only to the primary recipient device,
the primary recipient device being one of a plurality of destination devices associated with a recipient of the encrypted SMS message, and
one or more non-primary recipient devices being one or more of the plurality of destination devices associated with the recipient; and
provide the encrypted SMS message only to the primary recipient device and not to the one or more non-primary recipient devices identified as one or more of the plurality of destination devices associated with the recipient by the encrypted SMS message based on the flag to permit the primary recipient device to decrypt the encrypted SMS message, the encrypted SMS message being provided with the flag.

7. The non-transitory computer-readable medium of claim 6, where the flag comprises a value of a Session Initiation Protocol (SIP) header field of the encrypted SMS message.

8. The non-transitory computer-readable medium of claim 6, where the one or more instructions, that cause the one or more processors to identify the flag, cause the one or more processors to:
identify the flag based on a particular type-length-value element of a Short Message Peer-to-Peer (SMPP) protocol.

9. The non-transitory computer-readable medium of claim 6, where the device is a recipient cellular network device; and
where the one or more instructions, that cause the one or more processors to receive the encrypted SMS message, cause the one or more processors to:
receive the encrypted SMS message from an originating cellular network device associated with the originating device based on a Short Message Peer-to-Peer (SMPP) protocol.

10. The non-transitory computer-readable medium of claim 6, where the one or more instructions, that cause the one or more processors to provide the encrypted SMS message, cause the one or more processors to:
provide the flag to the primary recipient device to permit the primary recipient device to obtain a key, used to decrypt the encrypted SMS message, based on the flag.

11. The non-transitory computer-readable medium of claim 10, where the one or more instructions, that cause the one or more processors to provide the encrypted SMS message, cause the one or more processors to:
provide the flag to the primary recipient device to permit the primary recipient device to obtain the key from a key server, the key server to store or provide keys for encryption and decryption of SMS messages including the encrypted SMS message.

12. A method, comprising:

receiving, by a device, an encrypted short message service (SMS) message en route from an originating device to a primary recipient device associated with a recipient,
the encrypted SMS message to be encrypted by the originating device based on a key obtained from a key server;
the primary recipient device being one of a plurality of destination devices associated with the recipient, and
one or more non-primary recipient devices being one or more of the plurality of destination devices associated with the recipient;

identifying, by the device, a flag associated with the encrypted SMS message;

identifying, by the device and based on the flag, the primary recipient device associated with the recipient; and providing, by the device, the encrypted SMS message only to the primary recipient device and not to the one or more non-primary recipient devices that is identified as one or more of the plurality of destination devices associated with the recipient by the encrypted SMS message, where the encrypted SMS message is provided with the flag to permit the primary recipient device to obtain the key from the key server to decrypt the encrypted SMS message.

13. The method of claim 12, where the originating device is associated with a first service provider; and
where the primary recipient device is associated with a second service provider that is different from the first service provider.

14. The method of claim 12, where providing the encrypted SMS message further comprises:
providing security information in association with the encrypted SMS message,
the primary recipient device to obtain the key based on the security information.

15. The method of claim 12, where the flag comprises a value of a Session Initiation Protocol (SIP) header field of the encrypted SMS message.

16. The method of claim 15, where identifying the flag further comprises:
identifying the flag based on a particular type-length-value element of a Short Message Peer-to-Peer (SMPP) protocol.

17. The method of claim 12, further comprising:
changing a destination of the encrypted SMS message from one of the one or more non-primary recipient devices to the primary recipient device.

18. The device of claim 1, where the one or more processors are further to:
change a destination of the encrypted SMS message from one of the one or more non-primary recipient devices to the primary recipient device.

19. The non-transitory computer-readable medium of claim 6, where the one or more instructions, when executed by the one or more processors, cause the one or more processors to:
change a destination of the encrypted SMS message from one of the one or more non-primary recipient devices to the primary recipient device.

20. The device of claim 1, where the originating device is associated with a first service provider; and
where the primary recipient device is associated with a second service provider that is different from the first service provider.

* * * * *